United States Patent
Morshuis et al.

(10) Patent No.: US 6,393,975 B2
(45) Date of Patent: May 28, 2002

(54) TREATMENT APPARATUS AND METHOD FOR PRESERVING PUMPABLE FOOD PRODUCTS IN A PULSED ELECTRIC FIELD

(75) Inventors: Petrus Henricus F. Morshuis, Leiden; Henricus F. M. Van Den Bosch; Sjoerd W. H. De Haan, both of Delft; Jan A. Ferreira, Rijswijk, all of (NL)

(73) Assignee: Stork Food and Dairy Systems B.V., Amsterdam (NL)

( * ) Notice: Subject to any disclaimer, the term of this patent is extended or adjusted under 35 U.S.C. 154(b) by 0 days.

(21) Appl. No.: 09/774,345

(22) Filed: Jan. 31, 2001

(30) Foreign Application Priority Data

Feb. 2, 2000 (NL) .............................................. 1014266

(51) Int. Cl.⁷ .............................. A23L 3/00; A23L 3/26; A23L 3/32; A61L 2/00; A61L 2/02
(52) U.S. Cl. ........................ 99/451; 99/483; 99/DIG. 14
(58) Field of Search ................... 99/451, 483, DIG. 14, 99/516, 536, 358; 426/234, 237, 238, 521, 410, 407, 241, 247, 248; 422/22–24, 186.01, 186.03; 219/700, 735; 392/338, 497

(56) References Cited

U.S. PATENT DOCUMENTS

| | | | | |
|---|---|---|---|---|
| 3,876,373 A | * | 4/1975 | Glyptis ...................... 422/22 X |
| 4,457,221 A | | 7/1984 | Geren | |
| 4,524,079 A | * | 6/1985 | Hofmann ..................... 426/234 |
| 4,838,154 A | | 6/1989 | Dunn et al. | |
| 5,235,905 A | | 8/1993 | Bushnell et al. | |
| 5,250,160 A | * | 10/1993 | Oksman et al. ............ 99/451 X |
| 5,282,940 A | * | 2/1994 | Griffis et al. ................. 426/237 |
| 5,290,583 A | * | 3/1994 | Reznik et al. ........... 426/521 X |
| 5,415,882 A | * | 5/1995 | Knipper et al. .............. 426/237 |
| 5,514,391 A | * | 5/1996 | Bushnell et al. ............. 426/237 |
| 5,527,105 A | * | 6/1996 | Riach, Jr. .................... 426/237 |
| 5,534,278 A | * | 7/1996 | DeRuyter et al. .......... 99/451 X |
| 5,562,024 A | * | 10/1996 | Polny, Jr. ................... 99/483 X |
| 5,603,972 A | * | 2/1997 | McFarland .................... 422/22 |
| 5,607,710 A | * | 3/1997 | DeRuyter et al. ....... 99/DIG. 14 |
| 5,630,360 A | * | 5/1997 | Polny, Jr. ................... 99/358 X |
| 5,690,978 A | | 11/1997 | Yin et al. | |
| 5,925,324 A | | 7/1999 | Greer | |
| 6,019,031 A | | 2/2000 | Qin et al. | |

FOREIGN PATENT DOCUMENTS

| | | |
|---|---|---|
| EP | 0553377 A1 | 8/1993 |
| WO | WO 99/39752 | 8/1999 |
| WO | WO 00/00044 | 1/2000 |

* cited by examiner

Primary Examiner—Timothy F. Simone
(74) Attorney, Agent, or Firm—Hoffmann & Baron, LLP

(57) ABSTRACT

An apparatus for preserving food products in a pulsed electric field comprises a treatment chamber having an inlet for food products to be treated and an outlet fortreated food products and has an effective area of flow having rounded corners. The treatment chamber further comprises at least one first electrode and at least one second electrode which are disposed in such a way that the field lines of the electric field run parallel to one another, as well as an energy source and a potential controller to control the potential on at least one first electrode and on at least one second electrode in order to generate a pulsed electric field, of such design that the electric field in the effective area of flow is constant.

16 Claims, 2 Drawing Sheets

TREATMENT APPARATUS AND METHOD FOR PRESERVING PUMPABLE FOOD PRODUCTS IN A PULSED ELECTRIC FIELD

FIELD OF THE INVENTION

The present invention relates to a treatment apparatus for preserving pumpable food products in a pulsed electric field, said apparatus comprising a treatment chamber with an inlet for food products to be treated and an outlet for treated food products, the treatment chamber being provided with a system of electrodes which comprises at least one first electrode and at least one second electrode, as well as an electrical energy source connected to the electrodes and a potential controller to control a potential on at least one first electrode and on at least one second electrode in order to generate a pulsed electric field.

BACKGROUND OF THE INVENTION

A treatment apparatus of this type is known in the art, for example from the U.S. Pat. No. 4,457,221. In this known apparatus, a treatment of food products in a pulsed electric field (sometimes abbreviated in the art to PEF (Pulsed Electric Field) treatment) is carried out in order to destroy microorganisms such as spores, bacteria, moulds, yeasts and the like which are present in the food product and thus to extend the shelf life of the food products. Electroporation is the process which is assumed to occur in the microorganisms and thus to have a lethal effect on these. Compared with customary preserving treatments such as sterilization, pasteurization under the influence of heat, the treatment in a pulsed electric field has the advantage that no significant increase in temperature of the product occurs, which has a beneficial effect on the colour, texture, taste and the like of the food products.

One of the embodiments of a treatment apparatus disclosed by U.S. Pat. No. 4,457,221 consists of a treatment chamber which comprises an elongate cell having an inlet for products to be treated and an outlet for the treated products, wherein parallel plate electrodes, which are connected to a suitable current source and pulse generator and are driven thereby, are disposed along the two lateral walls which face one another. Owing to the fixed spacing between the parallel electrodes and the uniform charge density (per unit area) the strength of field E is constant, apart from those areas which border the ends of the plate electrodes. With this known apparatus there is the risk, however, that undesirable contaminants, for example dead matter, will accumulate in the corners of the container, this being a possibility, in particular, in the case of inhomogeneous food products.

In the case of another known PEF technique, as described, for example, in U.S. Pat. No. 5,690,978, the electrodes are disposed not opposite one another, but behind one another, in the flow direction of the product, and are separated by an insulator, for example as components of a round tube. The field lines of the electric field thus run substantially parallel to the flow direction. The magnitude of the electric field, measured in a plane perpendicular to the flow direction, and the magnitude in the longitudinal direction, are not the same everywhere, however, thus giving rise to a temperature gradient in the product, which temperature gradient in turn causes a change in the conductivity in the flow direction, as a result of which the field strength becomes even more inhomogeneous. A uniform product treatment is therefore difficult to achieve with this embodiment of the PEF technique.

Yet another treatment apparatus known in the art employs concentrically disposed electrodes, the product being guided into the annular gap between the electrodes and being subjected to a radially directed electric field. A drawback of this design, apart from its complexity, is the relatively small flow passage, as a result of which solid particles in a food product (eg. forcemeat balls in soup) may cause problems.

It is an object of the present invention to avoid the problems of the prior art apparatuses and methods outlined above.

More particularly, it is an object of the present invention to provide a uniform electric field across the effective area of flow of the treatment apparatus and in the longitudinal direction thereof, so that food products can be subjected to a uniform preserving treatment.

SUMMARY OF THE INVENTION

To this end, the treatment apparatus of the abovementioned type according to the invention is characterized in that the treatment chamber has an effective area of flow having rounded corners and the at least one first electrode and the at least one second electrode of the system of electrodes are disposed in such a way that the field lines of the electric field run parallel to one another and the potential controller is of such design that the electric field in the effective area of flow is uniform.

In the treatment apparatus according to the invention, the treatment chamber has an effective area of flow (i.e. perfused treatment-chamber area perpendicular to the flow direction) without corners or alternatively with rounded corners, so that no contaminants and the like can accumulate on the walls. Examples of such effective areas of flow are a circle and an ellipse. The first electrode(s) and the second electrode(s) are disposed in such a way that the field lines of the electric field generated during operation of the apparatus run substantially parallel to one another, in contrast to the radial field in the last-discussed PEF apparatus according to the prior art. In addition, the controller for the potential on the electrodes is of such design that the electric field in the effective area of flow is uniform. In other words, the magnitude and direction of the electric field are at all times constant in a plane perpendicular to the flow direction. As a result of the uniform electric field, the food products are subjected to a uniform preserving treatment.

The potential on an electrode disposed at a distance ij from a reference plane, said reference plane being perpendicular to the field direction, is governed by the general formula $V(ij)=E.ij$.

BRIEF DESCRIPTION OF THE DRAWING

The present invention is explained below with reference to the accompanying drawing, in which:

FIG. 1 is a schematic, perspective view of an embodiment of the second variation on a treatment apparatus according to the invention;

DESCRIPTION OF THE PREFERRED EMBODIMENTS

Figure 2:
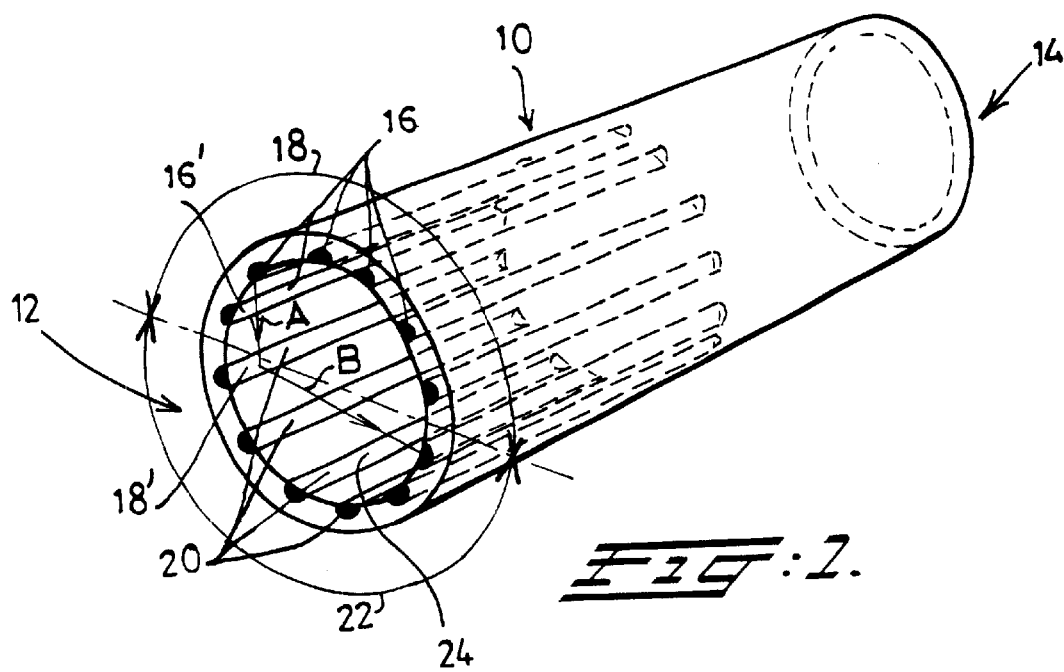
FIG. 2 is a schematic transverse section of an embodiment of the first variation on a treatment apparatus according to the invention.

According to a first variation on the treatment apparatus according to the invention, the treatment chamber comprises a rectangular housing with at least two plate-type electrodes disposed opposite and parallel to one another, with an effective area of flow with corners rounded by means of semiconducting material. The effective area of flow with rounded corners ensures that contaminants are unable to accumulate, while the semiconducting material contributes to a uniform electric field. The semiconducting material can be solid, with a conductivity which matches the conductivity of the food products to be treated. As the choice of the solid semiconducting material is related to the product to be treated, this variation on the treatment apparatus according to the invention is, to a certain degree, product-specific and less suitable for treating different food products having markedly different conductivities. Preferably, the semiconducting material is therefore replaceable, thus allowing the treatment chamber to be fitted, for each product if necessary, with a semiconducting material of a suitable conductivity. Examples of suitable semiconducting material comprise inter alia semiconducting ceramic material and glass fibre-reinforced semiconducting plastics.

Advantageously, the entire treatment chamber is replaceable, thereby allowing, in the event of a change in the product to be treated, a treatment chamber suitable for the new product with an appropriate conductivity of the semiconducting material to be inserted.

A semiconducting material can also comprise one or more compartments in which a liquid material is present, eg. a liquid component of the product to be treated. Whilst such an embodiment is likewise product-specific, replacement of the liquid material does allow more flexible operation. This last design has the additional advantage that induced circulation of the liquid material allows dissipation of heat to take place, said heat being an inevitable consequence of the treatment.

Since, in principle, the field lines of the electric field are perpendicular to the surface of the plate-type electrodes, disturbances which locally affect the uniformity of the field can occur on the upstream and downstream sides of these electrodes. To counteract these disturbances, the plate-type electrodes preferably have end sections which extend outwards in the upstream and downstream direction. These end sections preferably have a curved (convex) end face. The adjoining insulator sections likewise preferably have a convex surface of this type, the interspaces being filled with a semiconducting material.

To counteract disturbances at the lateral edges of the treatment chamber, the electrodes preferably extend on both sides, beyond the effective area of flow. The lateral sections of the electrodes which extend beyond the effective area of flow (i.e. in a plane perpendicular to the flow direction) are preferably rounded.

Advantageously, the effective area of flow, in the form of a rectangle having rounded corners, has a ratio of the distance between the electrodes to the maximum width of the effective area of flow of 2:3.

According to a second variation on the treatment apparatus according to the invention, a number of separate first electrodes, which are electrically insulated from one another, are disposed across a first section of the circumference of the treatment chamber and a number of separate second electrodes, which are electrically insulated from one another, across a second section of the circumference, the potential controller of said electrodes being of such design that the potential of each electrode is separately controllable so that the field strength in the effective area of flow is kept uniform. As the distance (d) between the first and second electrodes in this design is known, the potential (V) of these electrodes can be controlled by the potential controller in such a way that the field strength $E(=V/d)$ is constant. Each electrode is driven separately, eg. making use of a suitable electric power supply. If the apparatus according to the invention comprises a plurality of first and/or second electrodes, the distances between a specific first electrode and different second electrodes can vary. The dimensions of the electrodes can likewise be different.

Preferably, the first and second electrode(s) extend parallel to the longitudinal centre line of the treatment chamber and over the length thereof in the manner of bar electrodes.

If the electrodes are (partially) provided in or on the inner wall of the treatment chamber, positioning them in this way can cause a perturbation of the flow profile and damage to the food product, which is undesirable. The electrodes according to a preferred embodiment of the invention therefore have a crescent-shaped cross section of which one side has a radius of curvature which matches the radius of curvature of the effective area of flow, said side forming part of the internal perimeter of the treatment chamber. The treatment chamber therefore has a smooth inner surface, thus producing no perturbing effect on the flow of a product to be treated.

Preferably, the electrodes are disposed so as to be distributed at regular intervals over the circumference.

In the abovementioned second variation, the electrodes can likewise have a rounded (convex) leading edge and trailing edge.

The treatment apparatus according to the invention can be operated in a conventional manner, i.e. a high-power pulsed electric field is generated with a potential difference between the first electrode(s) and second electrode(s) of, for example, 100–200 kV and a current density of 0.3–10 A/mm$^2$ and a pulse duration in the order of magnitude of from 10 nanoseconds to 10 microseconds. It was found that if the direction of the electric field in successive pulses is rotated by 90° relative to one another in the effective area of flow less power is required. Dipoles arising in the food products are thought to be a possible explanation for this phenomenon. In order to accomplish this rotation, the controller in a further preferred embodiment of the invention is designed such that the direction of the electric field can be rotated over through 90°. A point-symmetric arrangement of the electrodes, in which each electrode forms part of two not simultaneously active circuits is one suitable option. Rotation of the electrodes themselves would produce the same effect, but is more difficult to achieve from a design point of view.

The invention also relates to a method for preserving food products, as defined in claim 17. This method is characterized by the rotation, through 90°, of the direction of the electric field in successive pulses. It will be understood that this method is not limited to the treatment apparatuses according to the invention, but can be employed in any apparatus comprising facing electrodes, for example the apparatus disclosed by U.S. Pat. No. 4,457,221. This method can equally be employed both in continuous and in (semi) batch processes.

Figure 4:
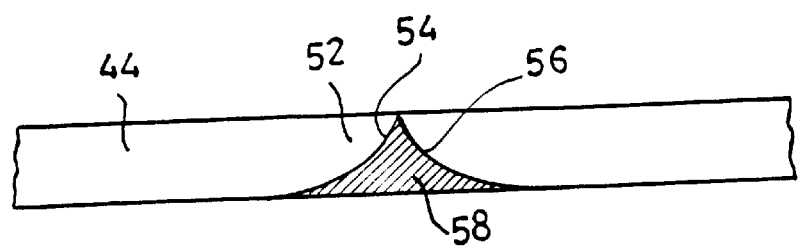
FIG. 4 is a schematic section in longitudinal direction of an end section of an electrode employed in FIG. 3.
Figure 2:
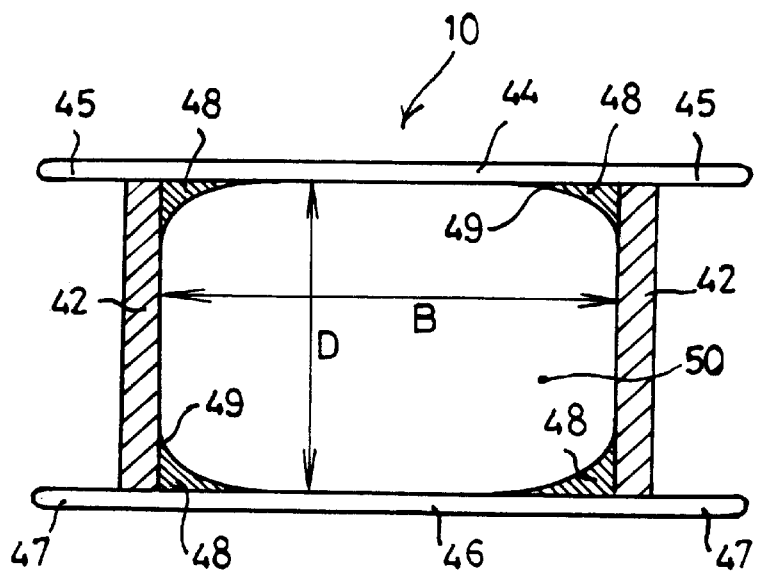
Figure 3:
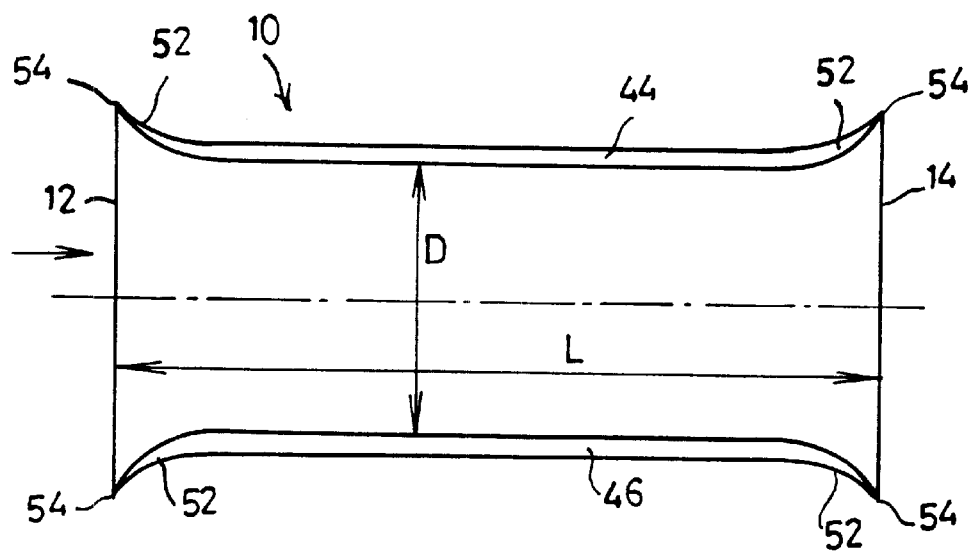
FIG. 3 shows a longitudinal section of a preferred embodiment of plate-type electrodes for use in the first variation on a treatment apparatus according to the invention.

The present invention is explained below with reference to the accompanying drawing, in which:

FIG. 1 is a schematic, perspective view of an embodiment of the second variation on a treatment apparatus according to the invention;

FIG. 2 is a schematic transverse section of an embodiment of the first variation on a treatment apparatus according to the invention;

FIG. 3 shows a longitudinal section of a preferred embodiment of plate-type electrodes for use in the first variation on a treatment apparatus according to the invention; and FIG. 4 is a schematic section in longitudinal direction of an end section of an electrode employed in FIG. 3.

FIG. 1 depicts a treatment apparatus according to the invention schematically in perspective. The apparatus comprises a treatment chamber 10, for example a section of a circular tube, which is fabricated from an electrically nonconductive material. The chamber 10 has an inlet 12 for introducing product to be treated and an outlet 14 for discharging the product treated in the chamber 10. The product is fed in and discharged continuously via a pump (not shown). The chamber 10 is provided with a number of first electrodes 16 which are distributed, spaced regularly with respect to one another, over a first section 18 of the inside of the chamber 10, and with second electrodes 20 which are distributed, spaced regularly with respect to one another, over a second section 22 of the inside of the chamber 10. For the sake of clarity, these electrodes are drawn filled in. All the electrodes 16 and 20 are electrically insulated from one another. In the embodiment shown, the electrodes 16 and 20 extend parallel to the longitudinal centre line of the treatment chamber. As shown, the electrodes have a crescent-shaped (half-moon) cross section, of which the side 24 facing the interior of the chamber 10 has a radius of curvature which is equal to the radius of the internal perimeter of the treatment chamber 10.

In the embodiment shown in FIG. 1 of the second variation on a treatment apparatus according to the invention, each electrode is separately driven by a controller (not shown). The electrodes are in electrical communication with a current source (not shown) whose potential and pulse duration are controlled by a controller provided with a pulse generator, so that the field strength E in the plane perpendicular to the flow direction of the food product is constant. In other words, $E=V_1/d_1=V_2/d_2$, where E: electric field strength [V/m]
V: potential difference between electrodes [V]
d: spacing between electrodes [m]
$_{1,2}$: first electrode pair and second electrode pair, respectively.

By suitably driving the potential on the electrodes it is possible to change the direction of the electric field over time, so that a first pulse generates an electric field from electrode 16' to electrode 18'—indicated by arrow A—while in the next pulse the direction of the electric field is rotated by 90°, as indicated by arrow B.

FIG. 2 shows an embodiment of a second variation on the treatment apparatus according to the invention, which consists of a rectangular and elongate treatment chamber 10 with plate-type electrodes 44 and 46 which are disposed at the top and bottom, respectively. Lateral walls 42 of the treatment chamber 10 are fabricated from an electrically nonconductive material. Disposed in the interior of the chamber 10, in the corners between the electrodes 44 and 46 and the lateral walls 42 are filling elements 48 having a hollow inner face 49. An effective area of flow 50 is thus delimited by the plate electrodes 44 and 46, lateral walls 42 and the filling elements 48. These filling elements 48 are fabricated from a semiconducting material having a conductivity which is equal to the conductivity of the food product to be treated in the chamber 10, so that the field strength in the effective area of flow perpendicular to the flow direction of the food product in the chamber 10 is uniform and the food products are thus subjected to a uniform treatment.

As shown by FIG. 2, the plate electrodes 44 and 46 extend on both sides beyond the effective area of flow 50 by means of lateral sections 45 and 47, respectively. The ratio of the distance D between electrodes 44 and 46 to the maximum width B of the effective area of flow 50 is 2:3.

FIG. 3 shows a longitudinal section of a preferred embodiment of the plate-type electrodes 44 and 46. These electrodes 44 and 46 are provided, on the upstream and downstream sides, with end sections 52 which extend outwards and have a convex end face 54, as shown in detail in FIG. 4. This ensures a more uniform field, even at the inlet 12 and outlet 14 of the treatment chamber 10, than with completely planar electrodes. The length L of the chamber 10 (and therefore all the electrodes 44 and 46) is more than 1.5 times the distance D between the electrodes.

FIG. 4 shows the end section 52 of electrode 44 according to FIG. 3, which is provided with the convex end face 54. The edge of the adjoining insulating material is provided with a similar convex face 56, the gap between the faces 54 and 56 being filled with semiconducting material

What is claimed is:

1. Treatment apparatus for preserving pumpable food products in a pulsed electric field, said apparatus comprising a treatment chamber with an inlet for food products to be treated and an outlet for treated food products, the treatment chamber being provided with a system of electrodes which comprises at least one first electrode and at least one second electrode, as well as an electrical energy source connected to the electrodes and a potential controller to control the potential on at least one first electrode and on at least one second electrode in order to generate a pulsed electric field, wherein the treatment chamber has an effective area of flow having rounded corners and the at least one first electrode and the at least one second electrode of the system of electrodes are disposed in such a way that the field lines of the electric field run parallel to one another and the potential controller is of such design that the electric field in the effective area of flow is uniform.

2. Treatment apparatus according to claim 1, wherein the treatment chamber comprises a rectangular housing with at least two plate-type electrodes disposed opposite and parallel to one another, with an effective area of flow of which the corners of the rectangular housing are rounded by means of semiconducting material.

3. Treatment apparatus according to claim 2, wherein the semiconducting material is solid and its conductivity matches the conductivity of the food products to be treated.

4. Treatment apparatus according to claim 2, wherein the semiconducting material comprises one or more compartments in which a liquid material is present.

5. Treatment apparatus according to claim 4, wherein the liquid material is selected from a liquid component of the food products to be treated.

6. Treatment apparatus according to claim 2, wherein the plate-type electrodes are provided with end sections which extend outwards.

7. Treatment apparatus according to claim 6, wherein the end sections have a curved end face.

8. Treatment apparatus according to claim 2, wherein the electrodes extend on both sides, in the direction perpendicular to the flow direction, beyond the effective area of flow.

9. Treatment apparatus according to claim 8, wherein the electrodes have rounded lateral sections.

10. Treatment apparatus according to claim 1, wherein a number of separate first electrodes, which are electrically insulated from one another, are disposed across a first section of the circumference of the treatment chamber and a number of separate second electrodes, which are electrically insulated from one another, across a second section of the circumference, the potential controller of said electrodes being of such design that the potential (V) of each electrode is separately controllable so that the field strength (E) in the effective area of flow is kept constant.

11. Treatment apparatus according to claim 10, wherein the first electrode(s) and second electrode(s) extend parallel to the longitudinal centre line of the treatment chamber and over the length thereof.

12. Treatment apparatus according to claim 11, wherein the electrodes have a crescent-shaped cross section of which one side has a radius of curvature which matches the radius of curvature of the effective area of flow, said side forming part of the internal perimeter of the treatment chamber.

13. Treatment apparatus according to claim 10, wherein the electrodes are disposed so as to be distributed at regular intervals over the circumference.

14. Treatment apparatus according to claim 1, wherein the potential controller is of such design that the direction of the electric field can be rotated through 90°.

15. Treatment apparatus according to claim 1, wherein the ratio of the spacing between the electrodes to the maximum width of the effective area of flow is 2:3.

16. Treatment apparatus according to claim 1, wherein the ratio of the length L of the treatment chamber to the spacing D between the electrodes is at least 3:2.

* * * * *